United States Patent
Chewins

(10) Patent No.: US 9,779,863 B2
(45) Date of Patent: Oct. 3, 2017

(54) REMOVABLE FLUID BARRIER

(71) Applicant: Elliott Chewins, Toronto (CA)

(72) Inventor: Elliott Chewins, Toronto (CA)

( * ) Notice: Subject to any disclaimer, the term of this patent is extended or adjusted under 35 U.S.C. 154(b) by 0 days.

(21) Appl. No.: 14/498,176

(22) Filed: Sep. 26, 2014

(65) Prior Publication Data

US 2016/0093427 A1    Mar. 31, 2016

(51) Int. Cl.
*H01F 7/02*     (2006.01)
*B29C 39/10*    (2006.01)
*B29C 39/12*    (2006.01)
*B29L 31/00*    (2006.01)

(52) U.S. Cl.
CPC ........... *H01F 7/0205* (2013.01); *B29C 39/10* (2013.01); *B29C 39/123* (2013.01); *B29L 2031/7126* (2013.01); *B29L 2031/7154* (2013.01)

(58) Field of Classification Search
CPC ... Y10T 428/24008; H01F 7/02; B63B 43/16; F16L 55/1683
USPC .......................................................... 428/99
See application file for complete search history.

(56) References Cited

U.S. PATENT DOCUMENTS

| | | | |
|---|---|---|---|
| 770,078 A | 9/1904 | Kruger | |
| 932,720 A | 8/1909 | Reinhardt | |
| 3,213,335 A | 10/1965 | Bourne | |
| 3,546,643 A * | 12/1970 | Virostek | H01F 7/0215 335/303 |
| 3,665,355 A * | 5/1972 | Sasaki | H01F 7/0215 101/389.1 |
| 4,023,651 A | 5/1977 | Healiss | |
| 5,038,701 A | 8/1991 | Riddell | |
| 5,165,356 A | 11/1992 | Williams | |
| 5,685,252 A | 11/1997 | Prysner | |
| 2010/0326609 A1 | 12/2010 | Sheridan | |

FOREIGN PATENT DOCUMENTS

WO    WO/9204574    3/1992

* cited by examiner

*Primary Examiner* — Alexander Thomas

(57) ABSTRACT

A removable fluid barrier comprises a generally planar flexible body fabricated of at least one resilient material and encapsulating a plurality of permanent magnets. The flexible body has an outer face defining a sealing surface of the removable fluid barrier.

10 Claims, 10 Drawing Sheets

US 9,779,863 B2

REMOVABLE FLUID BARRIER

FIELD OF THE INVENTION

The present invention relates generally to fluid containment, and in particular to a removable fluid barrier.

BACKGROUND OF THE INVENTION

Storage and transportation of hazardous fluids, such as hazardous liquids and gases, is known to be problematic, as any rupture that occurs in the tank containing the fluid can be difficult to mend quickly while fluid is still in the tank. Such ruptures typically result in leakage and/or spillage of hazardous fluid from the tank, which can contaminate and damage the surrounding environment.

For example, if a rail tank car is involved in a rail accident, it has been found that the leakage of the fluids from the ruptured tank car(s) into the surrounding environment is not easily prevented. Similar difficulties exist for other for fluid transport vehicles, such as rail tank cars and highway tanker trucks, as well as static fluid containers, such as unpressurized fluid storage tanks and 55 gallon drums. As most fluid transport vehicles and static fluid containers do not have internal baffles, the amount of fluid leakage in such cases can be significant.

A conventional approach to deal with such a rupture is to plug the rupture with a wooden peg. However, in many instances, the use of a wooden peg is inadequate to completely stop fluid flow through the plugged rupture.

Removable fluid barriers have also been considered. For example, International PCT Application No. WO 1992004574 to Goulding describes an apparatus that includes an aluminum backing plate onto which a sponge rubber layer is bonded. The sponge rubber layer has an impervious skin, which is impervious to liquids contained in a transport tanker or tank made of steel or another ferrous material to which the apparatus is to be applied for sealing a rupture therein. At the periphery of the backing plate are a set of eight permanent magnets which are also bonded to the aluminum plate. When a rupture occurs in the tanker or tank, the apparatus may be used to stem the flow of the leak by fastening the magnets to the tanker or tank to thereby compress the sponge rubber layer against the rupture.

Improvements are generally desired. It is therefore an object at least to provide a novel removable fluid barrier.

SUMMARY OF THE INVENTION

In one aspect, there is provided a removable fluid barrier, comprising a generally planar flexible body fabricated of at least one resilient material and encapsulating a plurality of permanent magnets, the flexible body having an outer face defining a sealing surface of the removable fluid barrier.

The plurality of permanent magnets may comprise one or more rare earth magnets.

The flexible body may comprise a first layer and a second layer. The plurality of permanent magnets may be accommodated by recesses in a face of the first layer. The permanent magnets may be generally uniformly distributed across a central portion of the first layer. The permanent magnets may be distributed across from about 50% to about 95% of the area of the face of the first layer. The first layer may comprise a margin extending around the periphery of the permanent magnets. The recesses may be interconnected such that adjacent permanent magnets abut. The outer face may be an outwardly-facing surface of the first layer or the second layer.

The at least one resilient material may comprise a polymer. The polymer may be polyurethane.

In another aspect, there is provided a method of manufacturing a removable fluid barrier, comprising forming a first layer of a flexible body; inserting permanent magnets into recesses of the first layer; and forming a second layer of the flexible body on the first layer, the second layer joining to the first layer to encapsulate the permanent magnets.

Forming the first layer may comprise providing a mold configured to form the first layer of the flexible body, the mold including one or more structures for forming the first layer to have, in cross-section, a plurality of the recesses with walls that extend from a first face of the first layer toward a second opposing face of the first layer; and pouring curable resin into the mold. Forming the second layer of the flexible body may comprise pouring curable resin into the mold to form the second layer. Forming the second layer of the flexible body may comprise placing the first layer with the magnets accommodated therein into another mold; and pouring curable resin into said another mold to form the second layer.

BRIEF DESCRIPTION OF THE DRAWINGS

Embodiments will now be described more fully with reference to the accompanying drawings in which.

DETAILED DESCRIPTION OF THE EMBODIMENTS

Figure 1:
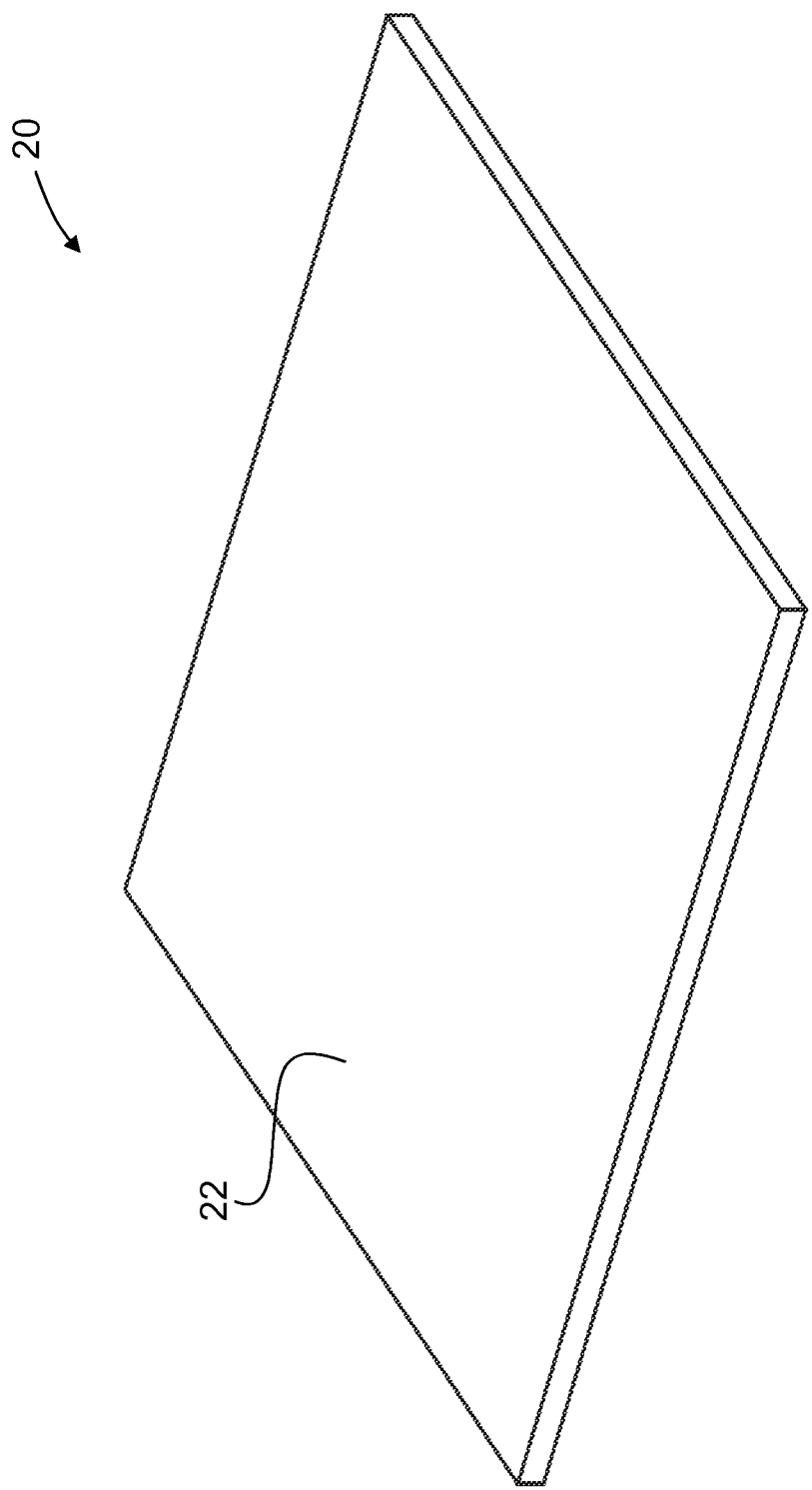
FIG. 1 is a perspective view of a removable fluid barrier.
Figure 2:
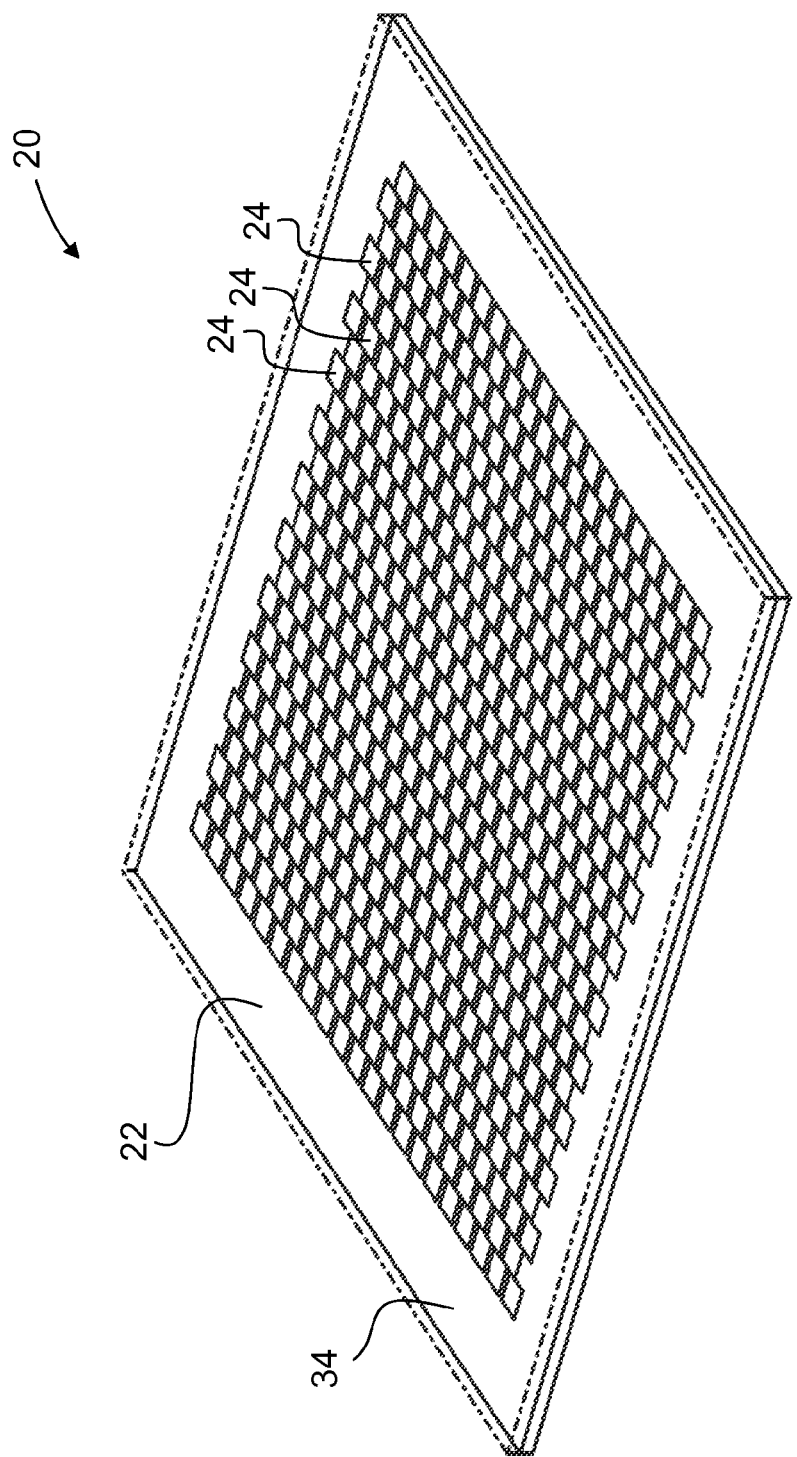
FIG. 2 is a perspective, partially transparent view of the removable fluid barrier of FIG. 1.
Figure 3:
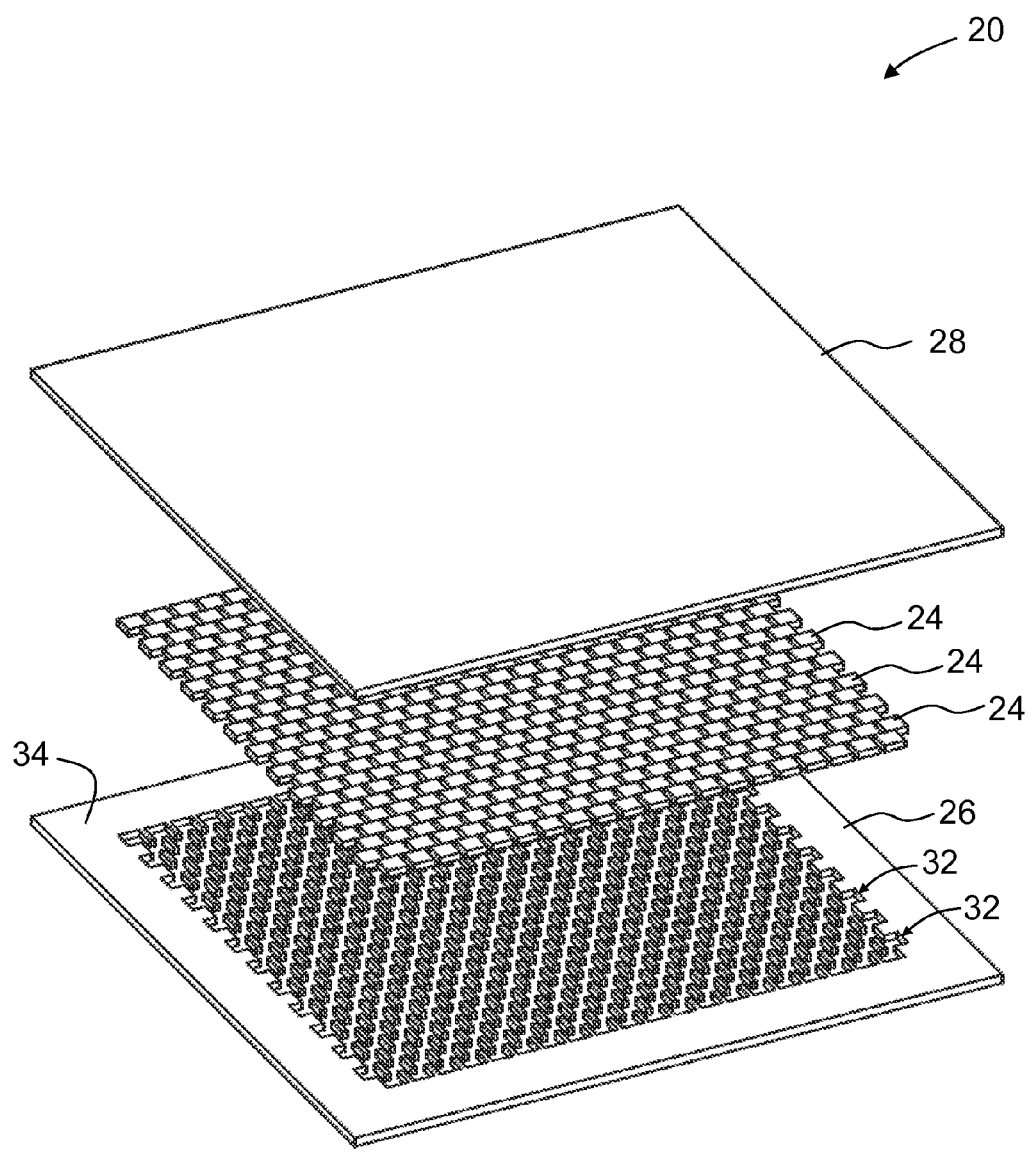
FIG. 3 is an exploded view of the removable fluid barrier of FIG. 1.
Figure 4:
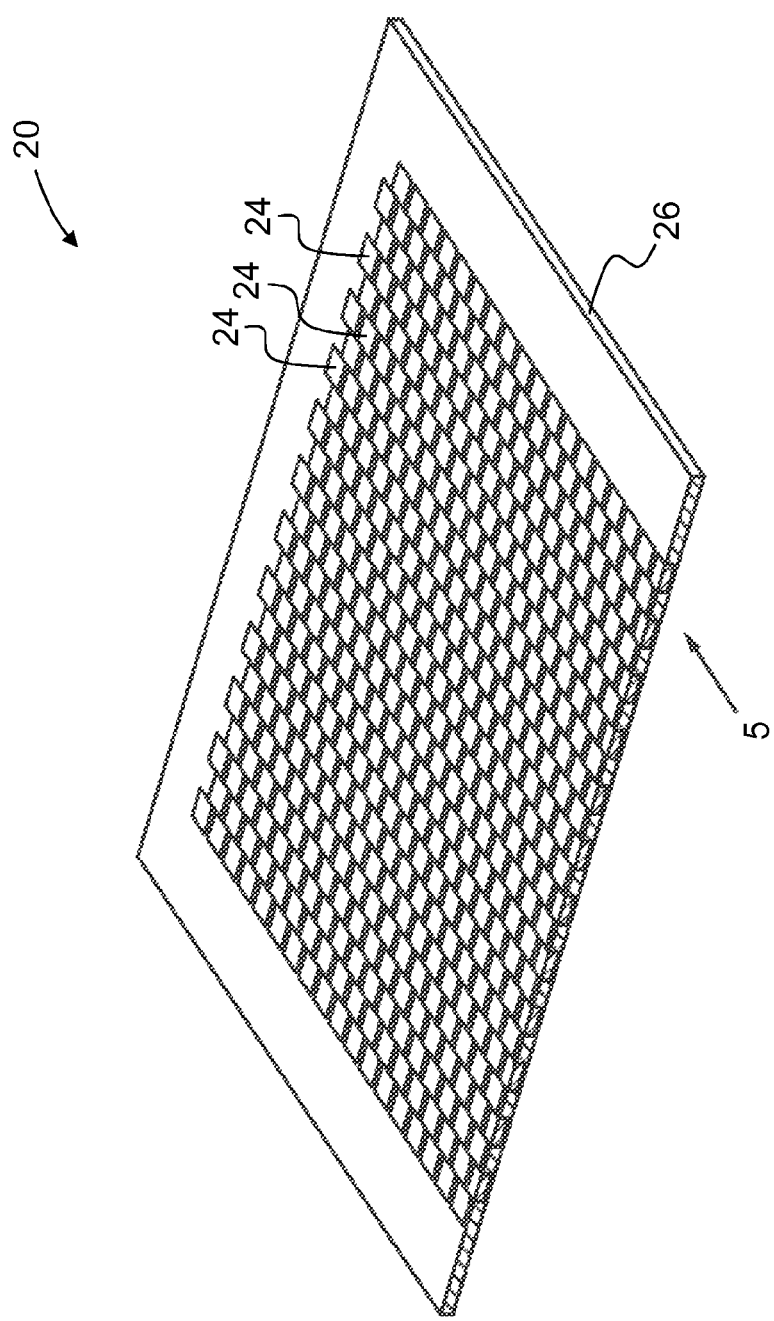
FIG. 4 is a perspective sectional view of a first layer accommodating permanent magnets and forming part of the removable fluid barrier of FIG. 1.
Figure 5:
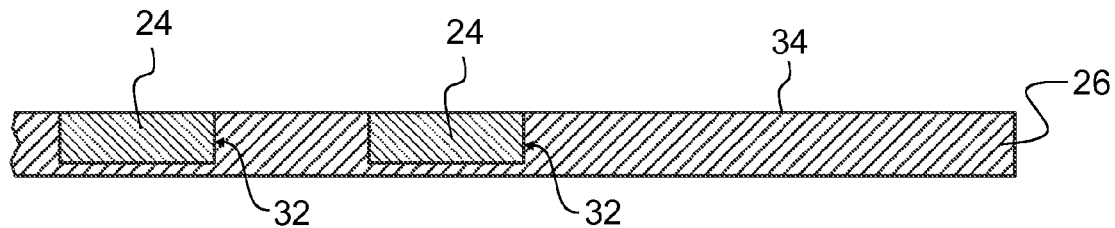
FIG. 5 is a fragmentary side view of a portion of the first layer and the permanent magnets of FIG. 4 indicated by reference numeral 5.

Turning now to FIGS. 1 to 6, a removable fluid barrier is shown and is generally indicated by reference numeral 20. Removable fluid barrier 20 is configured to be magnetically fastened to a ruptured fluid vessel made of steel or other ferrous material, such as for example a rail tank car, to cover the rupture for reducing or preventing leakage of fluid therefrom.

The removable fluid barrier 20 comprises a generally planar flexible body 22 fabricated of one or more resilient materials and encapsulating a plurality of permanent magnets 24. The flexible body 22 comprises a first layer 26 and a second layer 28. In this embodiment, each of the first layer 26 and the second layer 28 is fabricated of polyurethane, and is formed by casting. Also in this embodiment, the flexible body 22 has a generally square shape, and has dimensions of about 30 inches×about 30 inches×about 0.5 inches.

The first layer 26 has an array of recesses 32 formed on one side thereof, with each recess 32 being sized and shaped to accommodate a permanent magnet 24. The array of recesses 32 is generally centered on one side of the first layer 26, and covers a large portion thereof, such that a margin 34 extends around its periphery. The recesses 32 are arranged in a densely spaced pattern within the array. In the embodiment shown, the recesses 32 are distributed over about 65% of the area of the first layer, and the recesses 32 are interconnected such that adjacent permanent magnets 24 abut.

The second layer 28 has generally identical dimensions as the first layer 26. The second layer 28 is joined to the first layer 26, with the permanent magnets 24 accommodated therein, such that the first layer 26 and the second layer 28 provide an integrated, closed structure encapsulating the permanent magnets 24. The interface between the first layer 26 and the second layer 28 is strong, and has sufficient strength to remain joined during normal use of the removable fluid barrier 20. As a result of this strong interface, and as a result of the first layer 26 and the second layer 28 being fabricated of the same material, the flexible body 22 effectively has a unitary structure.

Figure 6:
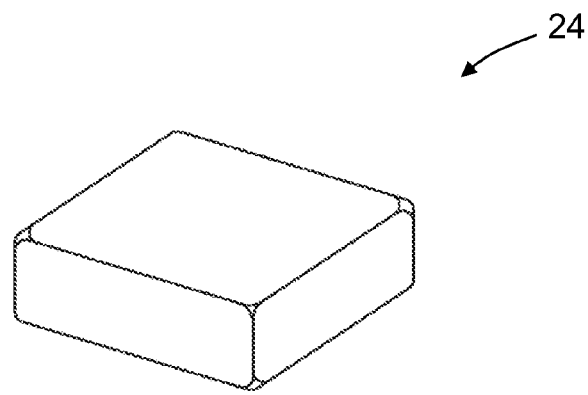
FIG. 6 is a perspective view of a permanent magnet forming part of the removable fluid barrier of FIG. 1.

FIG. 6 shows one of the permanent magnets 24. Each permanent magnet 24 is a rare earth magnet, and is fabricated of an alloy comprising one or more rare earth elements. Rare earth magnets are known to have a high magnetic strength, and more specifically a high energy product. As a result, the array of permanent magnets 24 enables the removable fluid barrier 20 to be very strongly magnetically fastened to ferrous structures. Each permanent magnet 24 is shaped so as to have two opposing faces, and is magnetically polarized such that each opposing face provides a respective one of the north pole or the south pole. Each permanent magnet 24 may be, for example, a grade N35 neodymium iron boron magnet, sold by United International Manufacture of Hong Kong.

Figure 7:
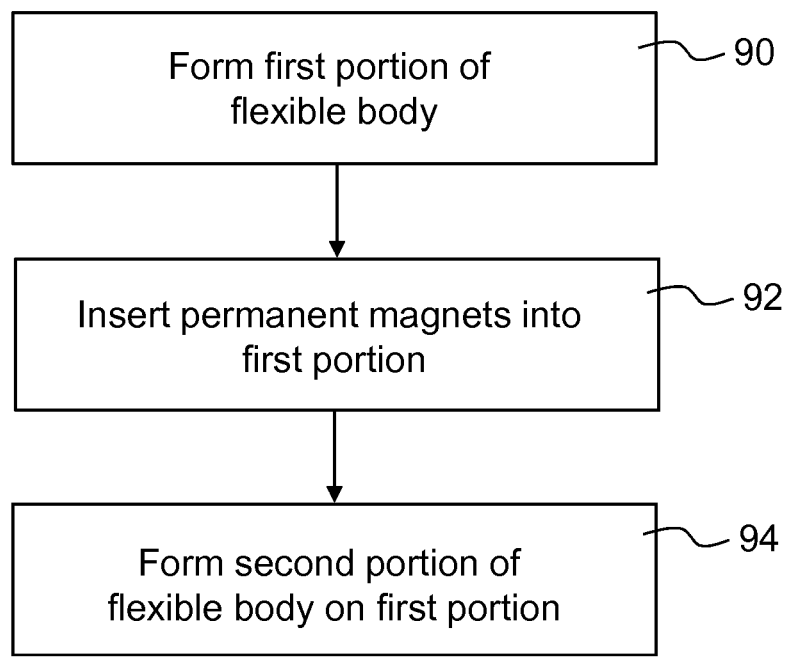
FIG. 7 is a flowchart of a method of manufacturing the removable fluid barrier of FIG. 1.
Figure 8:
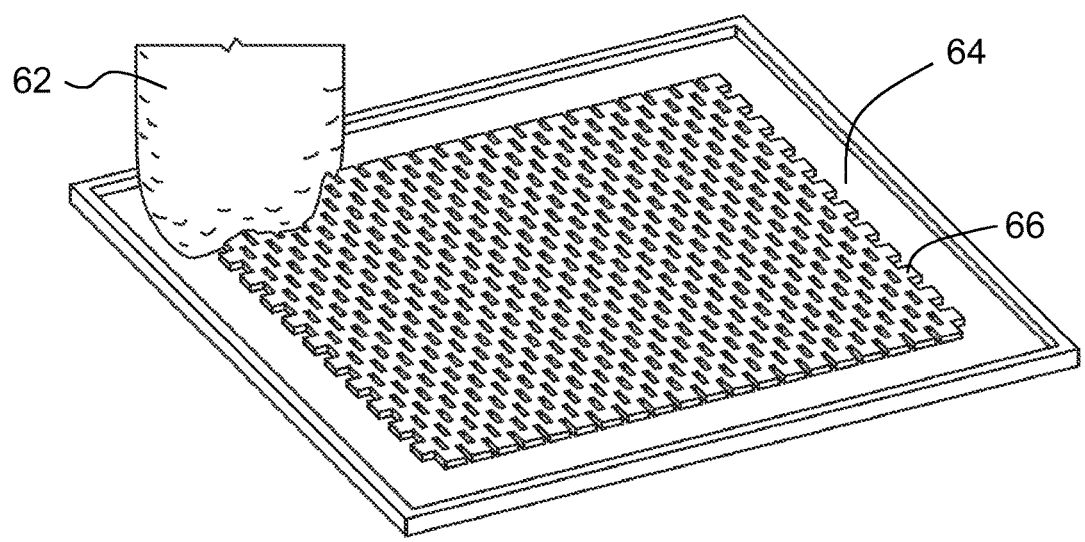
FIG. 8 is a perspective view of a first mold used to form the first layer.

FIG. 7 is a flowchart showing steps of a method of manufacturing a removable fluid barrier, such as the removable fluid barrier 20. First, the first layer 26 is cast by pouring polyurethane resin 62 into a first mold 64 comprising mold feature 66, as shown in FIG. 8. As will be understood, the mold feature 66 is shaped to form the array of recesses 32. The polyurethane resin 62 may be, for example, a thermoset polyurethane resin sold by Prothane of Milton, Ontario, Canada. Once the polyurethane resin 62 has cured within the mold 64, the first layer 26 is formed (step 90).

The first layer 26 is removed from the mold 64. The permanent magnets 24 are then inserted (not shown) into the recesses 32 of the first layer 26 (step 92). In this embodiment, the permanent magnets 24 are inserted such that their magnetic polarities all have the same orientation within the first layer 26.

Figure 9:
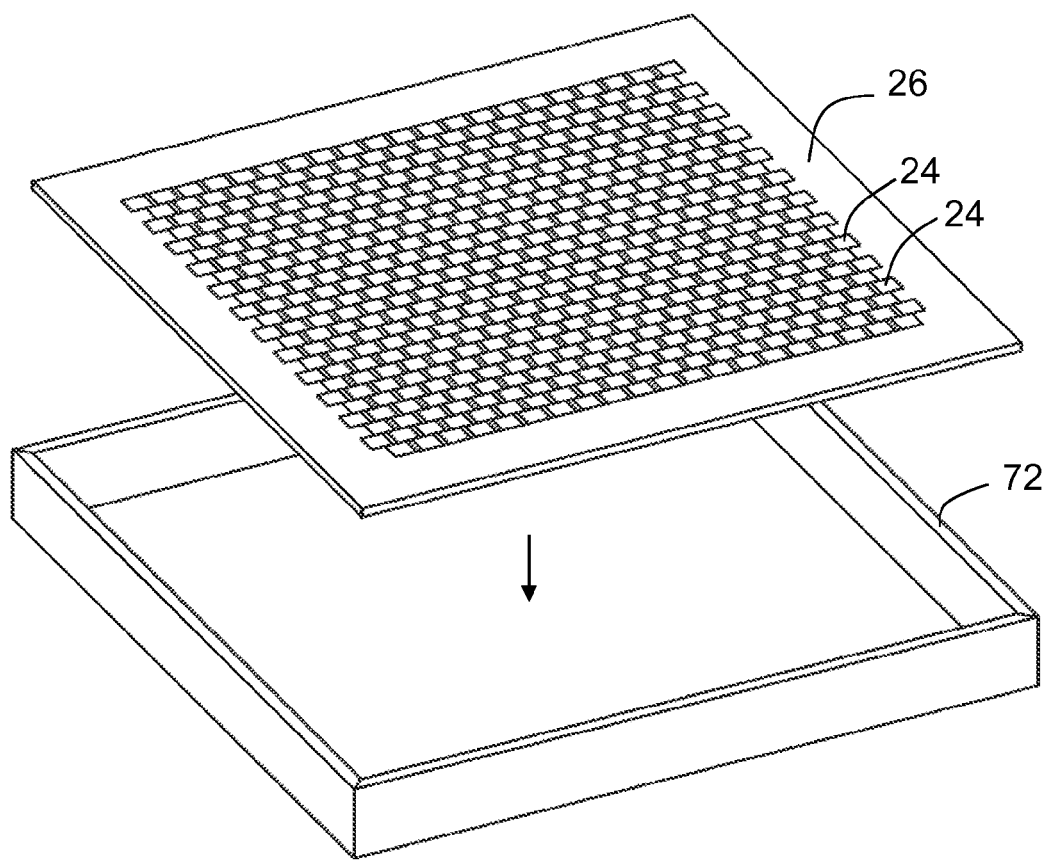
FIG. 9 is a perspective view of a second mold used to form a second layer forming part of the removable fluid barrier of FIG. 1.
Figure 10:
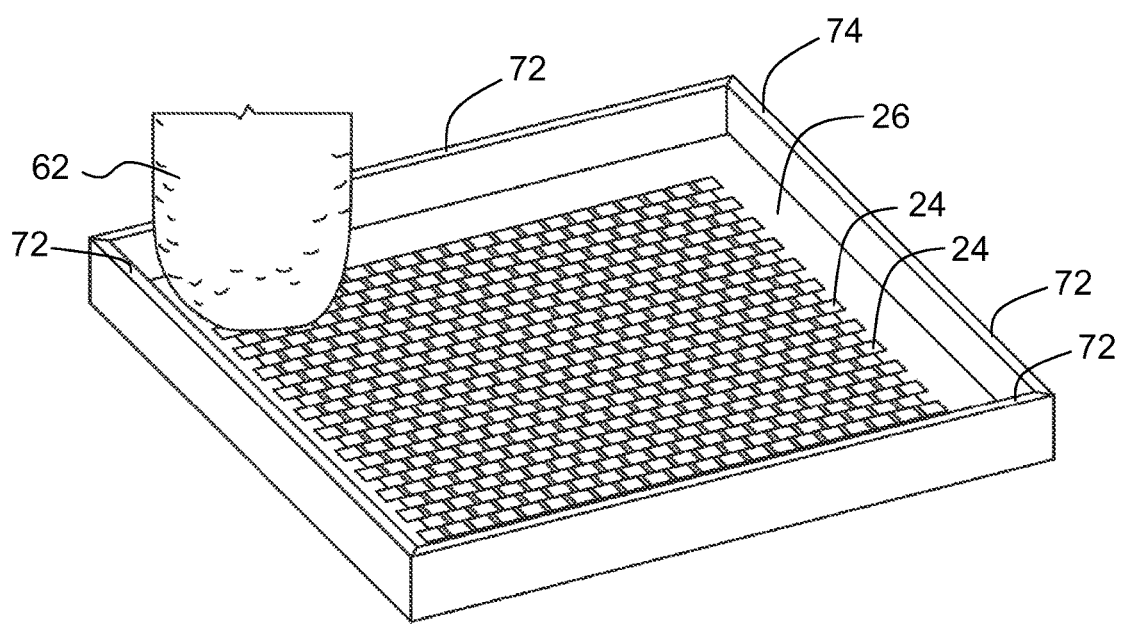
FIG. 10 is a perspective view of the second mold of FIG. 9, with the first layer accommodating the permanent magnets placed therein.

The first layer 26, with the permanent magnets 24 accommodated therein, is then placed into a second mold 72 which, in the embodiment shown, comprises four (4) aluminum sheets 74 assembled into a square frame, shown in FIG. 9. The second layer 28 is then cast by pouring polyurethane resin 62 into the second mold 72 and over the first layer 26 and the permanent magnets 24, as shown in FIG. 10. Once the polyurethane resin 62 has cured within the mold 72, the second layer 28 is formed (step 94).

In use, the removable fluid barrier 20 is applied to a ruptured ferrous fluid vessel (not shown) such that the removable fluid barrier 20 covers the rupture, and such that the first layer 26 contacts the ferrous fluid vessel around the rupture. The permanent magnets 24 provide a magnetic force of attraction to the ferrous fluid vessel. This magnetic force of attraction, in combination with the flexibility of the fluid barrier 20, causes the removable fluid barrier 20 to conform to and to become magnetically fastened to the ferrous fluid vessel. As will be understood, the flexibility of the removable fluid barrier 20 enables the removable fluid barrier 20 to conform to curvature of the ferrous fluid vessel. Further, the magnetic force of attraction, in combination with the flexibility of the first layer 26, causes the first layer 26 to compress against the ferrous fluid vessel, which thereby enables the removable fluid barrier 20 to effectively provide a fluid seal or an at least partial fluid seal around the rupture, so as to reduce or prevent the outflow of fluid through the rupture. In this manner, the outer surface of the first layer 26 defines a sealing surface of the removable fluid barrier 20.

It will be understood that the removable fluid barrier may alternatively be applied to the ruptured ferrous fluid vessel such that the second layer 28 contacts the ferrous fluid vessel. In such a case, the outer surface of the second layer defines a sealing surface of the removable fluid barrier.

The removable fluid barrier 20 may be removed by pulling an edge of the removable fluid barrier 20 away from the ferrous fluid vessel, and with sufficient force so as to overcome the magnetic force of attraction provided by the permanent magnets 24. The removable fluid barrier 20 may then be cleaned to remove fluid residue, if necessary, and may then be used for another application.

As an example, the removable fluid barrier 20 may be applied to a rupture any ferrous, low-pressure or unpressurized fluid vessel, such as for example a rail tank car, a highway transport tanker, a fluid storage tank, a drum container such as a 55 gallon drum, a low-pressure pipeline, and the like, so as to limit spillage of fluid from the fluid vessel. In such applications, the removable fluid barrier 20 may be used by emergency personnel, such as for example firefighters, to prevent or reduce leakage of fluid, such as hazardous liquid or gas.

As another example, the removable fluid barrier 20 may alternatively be applied to a ferrous drain structure, such as for example a sewer grate, a manhole cover, a floor drain cover, and the like, to reduce or prevent entry of fluid into the drain. In such applications, the removable fluid barrier 20 may be used by emergency personnel, such as for example firefighters, to prevent fluid spilled on a floor or ground surface from entering the drain, and to thereby contain the spill of fluid. The fluid may be hazardous liquid or gas.

As will be appreciated, the permanent magnets 24 fabricated of rare earth alloy advantageously provide a stronger magnetic force of attraction as compared to permanent magnets fabricated of other materials, such as for example ferrous permanent magnets. As will be understood, the stronger magnetic force of attraction provided by the permanent magnets 24 enables the removable fluid barrier 20 to become more strongly magnetically fastened to the ruptured ferrous fluid vessel, and to thereby withstand greater opposing forces arising from fluid pressure within the fluid vessel, as compared to conventional removable fluid barriers comprising ferrous permanent magnets.

As will be appreciated, the permanent magnets 24 allow the removable fluid barrier 20 to be magnetically fastened to the ruptured fluid vessel in a facile manner, and without the need to provide an electrical current and means for delivering such a current, as would be required for conventional removable fluid barriers comprising electromagnets. The permanent magnets 24 advantageously enable the removable fluid barrier 20 to be fastened quickly, which is particularly beneficial for emergency situations and situations involving hazardous materials.

As will be appreciated, the densely spaced configuration of the permanent magnets 24 advantageously enables the permanent magnets 24 to provide a much stronger total magnetic force of attraction over a given area, while allowing to the removable fluid barrier 20 to remain flexible, as compared to conventional fluid barriers comprising non-densely spaced configurations of magnets.

As will be appreciated, the removable fluid barrier 20 has a generally simple construction and consists of generally only three (3) components, namely the first layer 26, the plurality of permanent magnets 24, and the second layer 28. The simple construction advantageously allows the removable fluid barrier 20 to be manufactured at lower cost, as compared to conventional fluid barriers having more complex construction.

As will be appreciated, the use of a durable resilient material, such as polyurethane, for the first and second layers 26 and 28 advantageously enables these layers to provide sufficient structural integrity to contain the permanent magnets 24 during use, and to also each provide an outer surface that has sufficient flexibility to form a fluid seal against the fluid vessel.

As will be appreciated, the inclusion of a margin 34 in the first layer 26 allows the edges of the removable fluid barrier 20 to be easily lifted from the ferrous fluid vessel, which may effectively serve as a handle for facilitating removal of the removable fluid barrier 20.

Other configurations are possible. For example, although in the embodiment described above, the array of recesses covers only a portion of the first layer such that a margin extends around its periphery, in other embodiments, the removable fluid barrier may alternatively be configured such that substantially no margin extends around the periphery of the first layer. Such configurations may be desirable for removable fluid barriers of smaller size, for which the total magnetic force of attraction provided by the permanent magnets is less, and which therefore may be removed by pulling away from the ferrous fluid vessel using less force.

Figure 12:
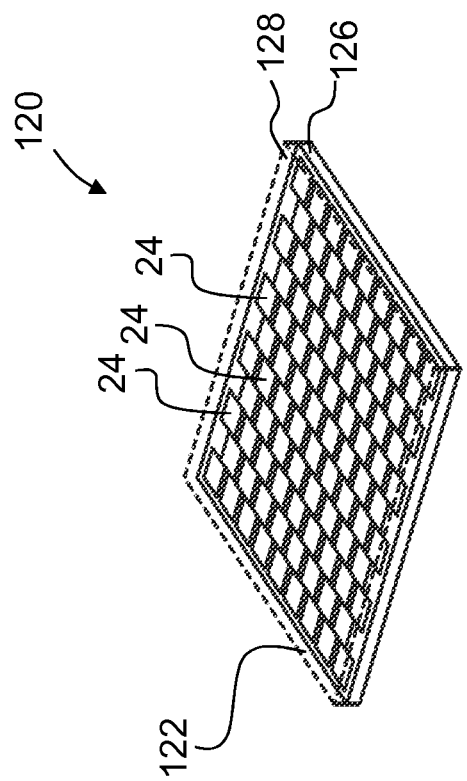
FIG. 12 is a perspective, partially transparent view of the removable fluid barrier of FIG. 11.
Figure 11:
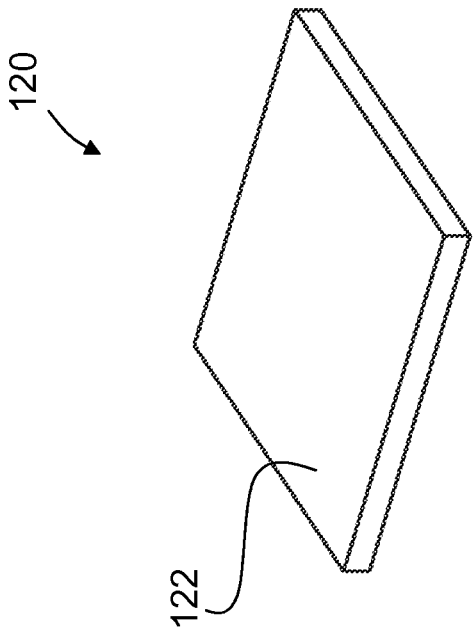
FIG. 11 is a perspective view of another embodiment of a removable fluid barrier.

For example, FIGS. 11 and 12 show another embodiment of a removable fluid barrier, which is generally indicated by reference numeral 120. Removable fluid barrier 120 is generally similar to removable fluid barrier 20 described above and with reference to FIGS. 1 to 6, and comprises a generally planar flexible body 122 fabricated of one or more resilient materials and encapsulating a plurality of permanent magnets 24. The flexible body 122 comprises a first layer 126 and a second layer 128, and in this embodiment, each of the first layer 126 and the second layer 128 is fabricated of polyurethane and is formed by casting. Also in this embodiment, the flexible body 122 has a generally square shape, and has dimensions of about 10 inches×about 10 inches×about 0.5 inches.

Similar to first layer 26 described above, the first layer 126 has an array of recesses (not shown) formed on one side thereof, with each recess being sized and shaped to accommodate a permanent magnet 24. The array of recesses is generally centered on the first layer 126. However, unlike the first layer 26 described above, the array of recesses covers generally the entirety of one side of the first layer 126, such that substantially no margin extends around its periphery. The recesses are arranged in a densely spaced pattern within the array. In this embodiment, the recesses are distributed across about 90% of the area of the first layer 126, and the recesses are interconnected such that adjacent permanent magnets 24 abut.

The second layer 128 has generally identical dimensions as the first layer 126. The second layer 128 is joined to the first layer 126, with the permanent magnets 24 accommodated therein, such that the first layer 126 and the second layer 128 provide an integrated, closed structure encapsulating the permanent magnets 24. The interface between the first layer 126 and the second layer 128 is strong, and has sufficient strength to remain joined during normal use of the removable fluid barrier 120. As a result of this strong interface, and as a result of the first layer 126 and the second layer 128 being fabricated of the same material, the flexible body 122 effectively has a unitary structure.

Although in the embodiment described above, the first layer and the second layer of the flexible body are both fabricated of polyurethane, in other embodiments, one or both of the first layer and the second layer may alternatively be fabricated of another suitable thermoset resin, from another suitable polymer, or from another suitable material, that provides suitable flexibility and suitable durability. In still other embodiments, an adhesive layer may alternatively be disposed between the first layer and the second layer.

Although in the embodiment described above, the first layer and the second layer are formed by casting, in other embodiments, one or both of the first layer and the second layer may alternatively be formed by another suitable method, such as for example injection molding, cutting from a slab of material, and the like.

Although in the embodiment described above, each permanent magnet is a rare earth magnet, in other embodiments, one or more of the permanent magnets may alternatively be ferrous magnets.

Although embodiments have been described above with reference to the accompanying drawings, those of skill in the art will appreciate that variations and modifications may be made without departing from the scope thereof as defined by the appended claims.

What is claimed is:

1. A removable fluid barrier, comprising:
a generally planar flexible body fabricated of at least one resilient material, the flexible body comprising a first layer and a second layer contacting each other, the first and second layers being fabricated in the same manner and being fabricated of the same at least one resilient material, the first and second layers having a closed-structure encapsulating a plurality of permanent magnets, adjacent permanent magnets abutting, one of the first layer and the second layer having an outer face defining a sealing surface of the removable fluid barrier.

2. The removable fluid barrier of claim 1, wherein the plurality of permanent magnets comprises one or more rare earth magnets.

3. The removable fluid barrier of claim 1, wherein the plurality of permanent magnets is accommodated by recesses in a face of the first layer.

4. The removable fluid barrier of claim 3, wherein the permanent magnets are generally uniformly distributed across a central portion of the first layer.

5. The removable fluid barrier of claim 3, wherein the permanent magnets are distributed across from about 50% to about 95% of the area of the face of the first layer.

6. The removable fluid barrier of claim 3, wherein the first layer comprises a margin extending around the periphery of the permanent magnets.

7. The removable fluid barrier of claim 3, wherein the recesses are interconnected.

8. The removable fluid barrier of claim 1, wherein the outer face is an outwardly-facing surface of the first layer or the second layer.

9. The removable fluid barrier of claim 1, wherein the at least one resilient material comprises a polymer.

10. The removable fluid barrier of claim 1, wherein the flexible body is fabricated of polyurethane.

\* \* \* \* \*